US011399045B2

(12) United States Patent
Latham et al.

(10) Patent No.: US 11,399,045 B2
(45) Date of Patent: *Jul. 26, 2022

(54) DETECTING FRAUDULENT LOGINS

(71) Applicant: T-Mobile USA, Inc., Bellevue, WA (US)

(72) Inventors: James Alexander Latham, Redmond, WA (US); Zoltan Homorodi, Snoqualmie, WA (US); Michael Engan, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/845,745

(22) Filed: Apr. 10, 2020

(65) Prior Publication Data
US 2020/0244709 A1 Jul. 30, 2020

Related U.S. Application Data

(63) Continuation of application No. 15/844,466, filed on Dec. 15, 2017, now Pat. No. 10,630,729.

(51) Int. Cl.
*H04L 9/40* (2022.01)
*G06N 20/00* (2019.01)
*H04L 67/52* (2022.01)

(52) U.S. Cl.
CPC .......... *H04L 63/308* (2013.01); *G06N 20/00* (2019.01); *H04L 63/083* (2013.01); *H04L 63/1425* (2013.01); *H04L 67/18* (2013.01)

(58) Field of Classification Search
CPC ... H04L 63/308; H04L 63/1425; H04L 67/18; H04L 63/083; G06N 20/00
See application file for complete search history.

(56) References Cited

U.S. PATENT DOCUMENTS

| | | | |
|---|---|---|---|
| 7,984,500 B1 * | 7/2011 | Khanna | G06F 21/60 726/22 |
| 8,856,923 B1 | 10/2014 | Kolman et al. | |
| 9,049,211 B1 | 6/2015 | Hearn | |
| 9,148,424 B1 * | 9/2015 | Yang | H04L 63/20 |
| 9,348,981 B1 | 5/2016 | Hearn et al. | |
| 10,009,330 B1 * | 6/2018 | Peer | H04L 63/08 |
| 10,115,108 B1 | 10/2018 | Gendelev et al. | |
| 10,181,032 B1 * | 1/2019 | Sadaghiani | G06N 3/08 |
| 10,587,596 B1 * | 3/2020 | Sahar | H04L 63/08 |

(Continued)

OTHER PUBLICATIONS

Office Action for U.S. Appl. No. 15/844,466, dated Aug. 8, 2019, Latham, "Detecting Fraudulent Logins", 10 pages.

*Primary Examiner* — Matthew Smithers
(74) *Attorney, Agent, or Firm* — Lee & Hayes, P.C.

(57) ABSTRACT

A network-accessible service such as a web site may authenticate users through a login process. In order to detect possibly fraudulent login events, the service may implement a framework based on recorded login events. For example, attributes of multiple recorded login events may be analyzed to create a framework that can be applied to attributes of newly received login requests to predict whether the newly received login requests are fraudulent. The framework may comprise criteria, algorithms, rules, models, and/or techniques, and may be constructed using various means such as pattern recognition, machine learning, and/or cluster analysis.

18 Claims, 4 Drawing Sheets

(56) References Cited

U.S. PATENT DOCUMENTS

| | | |
|---|---|---|
| 10,630,729 B2 * | 4/2020 | Latham .................. H04L 67/18 |
| 2014/0101197 A1 | 4/2014 | Charytoniuk |
| 2014/0230051 A1 * | 8/2014 | Vallinayagam ..... H04L 63/1416 |
| | | 726/22 |
| 2018/0041530 A1 | 2/2018 | Tang et al. |
| 2019/0081968 A1 * | 3/2019 | Wang ...................... G06F 21/31 |
| 2019/0190962 A1 | 6/2019 | Latham et al. |

\* cited by examiner

DETECTING FRAUDULENT LOGINS

CROSS-REFERENCE TO RELATED APPLICATION(S)

This application is a continuation of and claims priority to U.S. application Ser. No. 15/844,466, filed on Dec. 15, 2017 and entitled "Detecting Fraudulent Logins," the entirety of which is incorporated herein by reference.

BACKGROUND

Many types of services are provided using web-based servers and applications. For example, a provider of a service may set up a web site that is accessible through the Internet using an Internet browser. As another example, a computer application or device application may be provided by a service provider to access provider services, and may rely for its operation upon interactions with a network-based server.

In order to protect systems from unauthorized use, network-based services often ask each user to provide a username and corresponding password before allowing access to the services. Systems such as this that rely on single-factor authentication can be susceptible to attack by malicious entities who impersonate legitimate users. For example, passwords can sometimes be guessed or derived from information known about a legitimate user.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
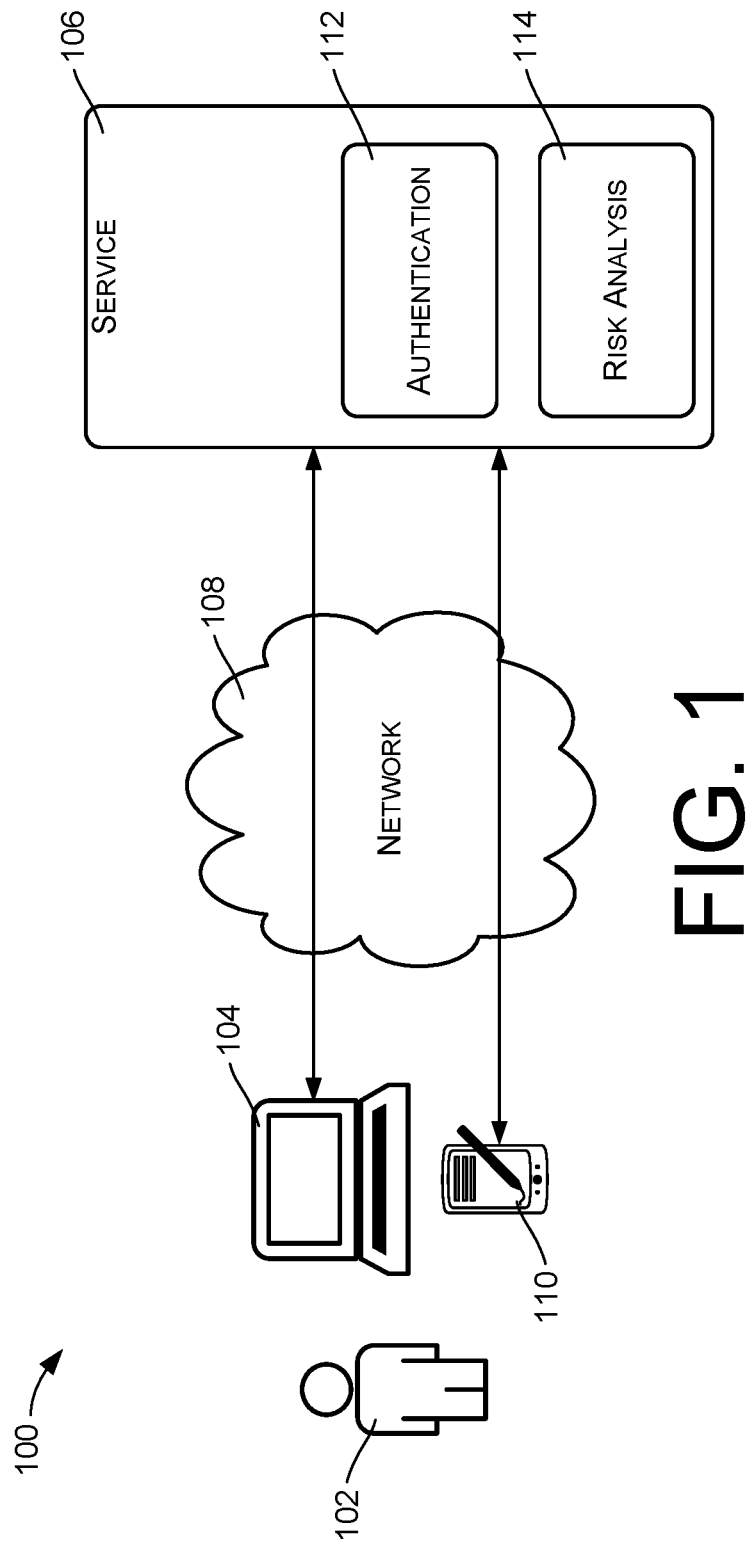
FIG. 1 is a block diagram of an example system for providing networked services to users.

The described implementations provide devices, systems, and methods for controlling access to password-protected resources, as well as to resources that may be protected by other forms of authentication.

In certain embodiments, authorization for accessing resources is obtained by what is referred to as a login. In some systems, a user may perform a login by supplying credentials such as a username and associated password.

In certain embodiments described herein, a provider of a network-based service records logins by users of the service. The information may include, for example, the times and dates of the logins, the source IP (Internet Protocol) addresses and other information relating to the devices sending login requests, geographic locations from which logins were attempted, and any other attributes that may be associated with logins.

The attributes of the recorded logins, referred to herein as login attributes, are then analyzed to determine patterns or conditions that are characteristic of fraudulent and/or non-fraudulent logins. More generally, a risk framework is developed based on the login attributes of the logins. The risk framework, which may comprise one or more algorithms, rules, models, techniques, etc., is applied to the attributes of newly received login requests in order to predict a level of risk for each login request, where the level of risk corresponds to the risk that the login request is fraudulent. The risk level generated by the risk framework for a particular login request is then used as part of a decision regarding whether to allow the requesting user to access the services of the service provider. In some cases, the risk level may be relatively high, and the provider system may deny the login or deny certain services or operations, even though the user provided the correct username and password.

As an example, consider the situation in which a particular user has established a pattern of logging in at a particular time of day, time of week, or time of month. If the user subsequently attempts to log in at a time that breaks a previously established pattern such as this, the risk framework may indicate an increased risk level, and the provider system may refuse access to the user or request an additional authentication factor.

Different login attributes and relations between login attributes may be used to formulate specific rules or criteria that when considered together form the basis of risk level. For example, a set of multiple criteria may be evaluated against the attributes of a particular login request, and the provider system may deny the login request if multiple criteria combine to exceed a risk threshold.

As another example, attributes associated with past logins can be used as training data by a machine learning algorithm to develop a model that can then be applied to new login requests in order to create and improve risk level calculations.

As yet another example, data clustering techniques can be used to identify clusters of valid (i.e., non-fraudulent) recorded logins having similar attributes. New login requests having attributes that are not within any of the clusters or that are more than a specified distance from the nearest cluster may be assigned a relatively high risk level. Similarly, the training data might be analyzed to find clusters of fraudulent login requests, and new login requests that fall within these clusters may be assigned relatively high risk levels.

The techniques described herein can be used before allowing many types of network requests and transactions, not limited to network logins. For example, risk analysis may be performed before responding to purchase requests or other requests involving fund transfers.

FIG. 1 illustrates relevant components of a network system 100 in which a user 102 uses a user terminal 104 to log in into and interact with a service 106 through a wide-area network (WAN) 108. After a successful login, the user is allowed to access the service 106 and its resources.

The terminal 104 may comprise any type of network-enabled device, such as a personal computer, a smartphone, a tablet computer, a wearable device, etc. The terminal 104 may communicate over the WAN 108 using wired and/or wireless capabilities, including Wi-Fi and cellular capabilities.

The service 106 may comprise or may be implemented by one or more servers (not shown) that are used by a service provider to provide services to various users such as the user 102. For example, the service 106 may comprise one or more web servers that implement web pages accessible through the WAN 108. The term "server," as used herein, refers to any computational entity or combination of computational entities that provides services for one or more persons or other entities.

The WAN 108 may comprise or may include the Internet or any other public or private data communications network, including both wired and wireless networks. In some cases, the WAN 108 may comprise or may include a cellular communications network, and the user may log in using a personal mobile device 110 such as a smartphone. In cases where the WAN 108 comprises a cellular communications network, the terminal 104 may comprise or include a cellular or other wireless device provided by a communications provider, and the service 106 may provide services on behalf of the communications provider. For example, the service 106 may implement a web page accessible by the user 102 using the terminal 104 for accessing account information.

In addition to other components and/or functional elements not shown, the service 106 implements an authentication component 112. The authentication component 112 in FIG. 1 represents functional elements of the service 106 that are involved in authenticating users, typically by conducting a login process. During the login process, the user 102 provides a username, password, and/or other credentials. The authentication component 112 determines whether the correct password or credentials have been provided. If the user 102 has submitted valid credentials, and the user 102 is granted access to the services 106, subject to further safeguards as described below. If the user 102 fails to submit valid credentials, the user 102 is denied access to the service 106.

For purposes of this disclosure, the term "login" is used to indicate a login event, in which a user is asked to identify themselves by providing some type of credential or credentials and a decision is made of whether the credentials are valid. A login is considered successful if the user provides valid credentials. An attempted login is considered unsuccessful or failed if the user does not provide valid credentials. The term "login" as used herein includes both successful and unsuccessful login events.

The service 106 may include a risk analysis component 114, which may be used by or in conjunction with the authentication component 112. The risk analysis component 114 predicts the likelihood or risk that a login is being attempted by someone other than the user 102, using the user's credentials. If a login is determined to have greater than a threshold level of risk by the risk analysis component 114, the authentication component 112 may request additional authentication factors or deny access by the user 102 to the service 106 or to certain resources or functions of the service 106, despite an otherwise successful login.

For purposes of this disclosure, a login or attempted login by someone other than an authorized user, using the credentials of the authorized user 102, is referred to as a fraudulent login. An operation such as a transaction, request, or other event that happens under the authorization granted to someone other than an authorized user, who has successfully logged in using the credentials of the authorized user, is referred to as a fraudulent operation.

Figure 2:
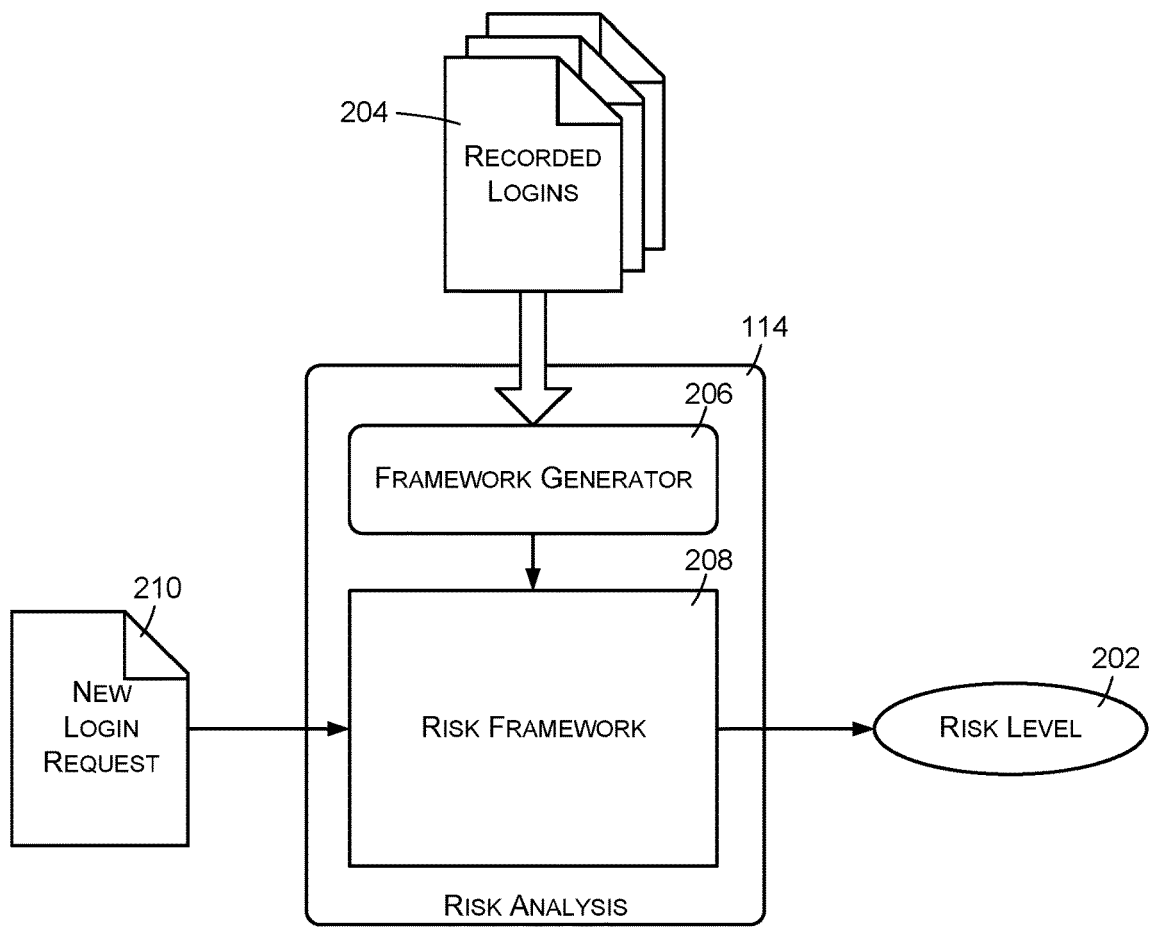
FIG. 2 is a block diagram showing an example implementation of a risk analysis component.

FIG. 2 illustrates functions performed by the risk analysis component 114 in one embodiment. Generally, the risk analysis component 114 determines the risk level 202 associated with a new login request based on attributes associated with the new login request and the attributes associated with multiple previous, recorded logins of multiple users.

As logins are processed by the authentication component 112, the service 106 creates respectively corresponding data objects, referred to herein as login data objects. Each login has or is associated with various attributes, and the data object corresponding to the login specifies those attributes. As examples, login attributes may comprise the username of the user performing the login, whether the login was successful (e.g., the user provided the correct password or other credentials), whether the login was eventually determined to have been fraudulent, the time that the login was processed, the source IP (Internet Protocol) address of the device or other network entity from which the login request originated, the approximate geographic location of the user, and so forth. As logins are processed, the corresponding data objects are stored to accumulate a collection of recorded login data objects 204, corresponding respectively to recorded logins by various users.

The risk analysis component 114 has a framework generator 206 that analyzes the attributes indicated by the recorded login data objects 204, referred to herein as login attributes, to create a risk framework 208. The risk framework 208 comprises one or more criteria, algorithms, rules, models, or techniques used for making a decision regarding whether a new login request is likely to be fraudulent. After or in conjunction with each new login request, including a successful login request, the risk framework 208 evaluates attributes of the new login request to determine the likelihood that the new login request is fraudulent. If the risk level associated with the login request exceeds a predetermined risk threshold, access to the service 106 is denied, despite the user having possibly supplied a valid username and password or other valid credentials.

Generally, the evaluation performed by the risk framework may be based on many different attributes or combinations of attributes of a particular login request from a particular user, as indicated by a request data object 210. The attributes indicated by the request data object 210, referred to herein as request attributes, may comprise all or a subset of the login attributes indicated by the recorded login data objects 204. The evaluation performed by the risk framework may also be based on attributes or combinations of attributes of other users, such as IP addresses or locations associated with a high rate of fraud. After processing a login request, the request attributes of the login request are saved as a recorded login object.

The framework generator 206 can be implemented in various ways to produce various types of risk frameworks 208. As one example, the framework generator 206 might evaluate the attributes of recorded logins to determine login patterns of an individual user. In some cases, there might be a temporal pattern of logins by the user, such as a successful login at around 8 am every morning. Based on this information, the framework generator 206 might generate a rule or a criterion specifying that logins at significantly different times than 8 am are more likely to be fraudulent. As another example, the user may have a pattern of logging in from a location or geographic area, and a login by this user from a different location might be deemed to be relatively more likely to be fraudulent. As yet another example, the framework generator might detect that most users log in less than twice a day, and as a result may generate a rule or criteria specifying that more frequent logins by any particular user are more likely to be fraudulent. The risk framework 208 may be configured to evaluate multiple rules or criteria, and to deny access to the service 106 when some combination of the rules or criteria are satisfied, or when the risk level resulting from the rules or criteria becomes sufficiently high.

In some cases, the risk framework 208 might evaluate multiple criteria indicating the risk that a login request is either valid or fraudulent, and a login request or other access might be rejected when a predefined number of such criteria are satisfied. When a login request meets a single one of the criteria, for example, the login request might be accepted. However, when a login request meets two or more of the criteria, the login request might be rejected. In addition, results of different rules or criteria may be weighted and combined to create a weighted or combined risk for any particular login request, which may then be compared to a threshold.

While rules can in some cases be generated by evaluating the attributes of many users' recorded logins, the rules themselves are formulated in terms of the attributes of a current login request, and in some cases also in terms of one or more previous logins by the same user.

In some cases, the framework generator 206 might evaluate the attributes indicated by the recorded login data objects 204 to identify clusters of valid (i.e. non-fraudulent) recorded logins having similar attributes, and the risk framework 208 may comprise a specification of those clusters. The attributes of a new login request are then evaluated by the risk framework 208 to determine whether the request attributes place the new login request within or near one of the clusters. If not, the new login request may be considered to be fraudulent.

In some cases, the framework generator 206 might use machine learning techniques to evaluate the attributes of recorded logins, in some cases based in part on the knowledge of which recorded logins are valid and which are fraudulent, to create a machine learning model that can be used with respect to new login requests to predict the likelihood that any new login request is fraudulent.

Attributes indicated by the recorded login data objects 204 and/or the request data object 210 may include, with respect to a login request of a user and/or a resulting login:

an identification of the user requesting the login, such as a username;
a time and/or date of the login;
an IP address from which the login request originated;
a location determined from the source IP address of the login request by geolocation techniques;
a location of a personal, mobile communication device associated with the user, in situations where the login request is received from a device or terminal other than the mobile communication device;
a frequency of previous login requests by the user;
identifications of previous unsuccessful logins by the user;
identifications of previous successful logins of the user;
identity of the mobile communication device;
system and configuration variables relating to the mobile communication device; or
method of providing authentication, such as by password or biometrics;
etc.

The framework generator 206 evaluates one or more of the above attributes, as indicated by the multiple recorded login data objects 204, to create the risk framework 208. The risk framework 208 evaluates one or more of these attributes, as indicated by the request data object 210, to determine a risk level associated with a new login request. Both evaluations may also consider relationships between attributes, such as whether the host IP address changes from request to request for a single user, whether the time of a new request is significantly different than a pattern of previous requests by the user, etc.

Figure 3:
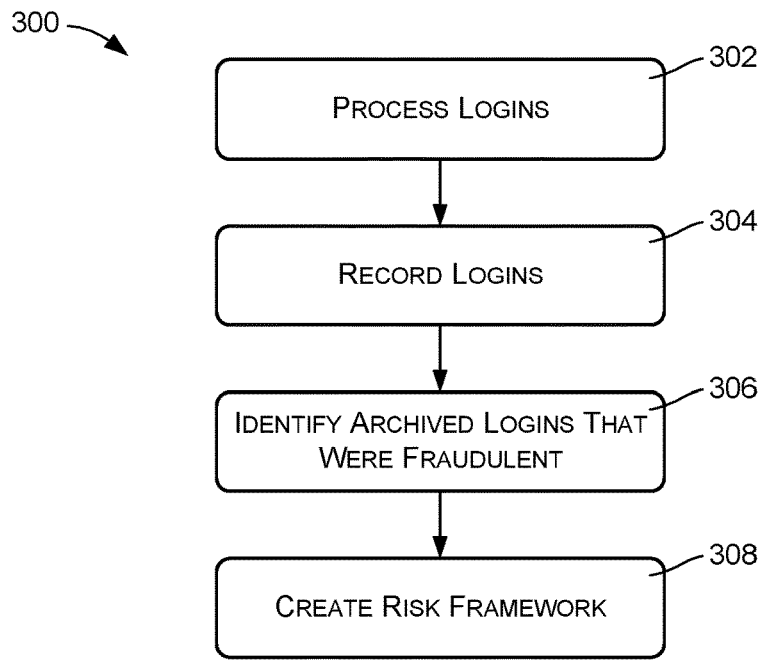
FIGS. 3 and 4 are flow diagrams illustrating an example method of detecting and/or preventing fraudulent use of network services.

FIG. 3 illustrates an example method 300 for creating a risk framework such as the risk framework 208 of FIG. 2. An action 302, which may be performed as an example by the authentication component 112 associated with the network-based service 106, comprises processing multiple login events, which are also referred to herein simply as logins. Processing login events may include receiving and processing login requests from multiple users. More specifically, login requests may be received from terminals, computers, smartphones, or other devices with which users interact. As part of a login request, a user may provide one or more credentials such as a username and password. A user's access to services is contingent upon providing valid credentials, as well as upon the result of risk analysis as described herein.

In practice, a login event may comprise several communications between a user and a network service or other entity. For example, a login event may include receiving a login request, requesting and/or receiving user credentials, validating the user credentials, notifying the user of a successful or unsuccessful login, and generally interacting with the user to obtain information used for identifying and authenticating the user.

An action 304 comprises recording the login events, including successful logins and unsuccessful login attempts. More specifically, the action 304 comprises determining and recording attributes associated with the login events. In the described embodiment, the attributes of a login event are recorded as a login data object. Accordingly, each recorded login data object represents and corresponds to a recorded login event. The data objects may be archived in any suitable database.

An action 306 may be performed in some embodiments. The action 306 comprises identifying any recorded logins that are eventually determined to have been fraudulent. More specifically, as fraudulent events are discovered by the service provider, the corresponding recorded login data objects are flagged or otherwise modified so that each recorded login data object indicates whether or not the associated login was eventually determined to be fraudulent.

An action 308 comprises analyzing the attributes of multiple recorded login events, to create a risk framework such as the risk framework 208. The risk framework 208 is configured to evaluate attributes of new login requests to predict which of the new login requests are fraudulent.

As discussed above, various techniques may be used in the action 308 to create frameworks of different types. As one example, a framework may comprise rules or criteria that can be evaluated based at least in part on the attributes of a new login request, to characterize the login request as being either fraudulent or non-fraudulent. The rules and/or criteria may be created based on previously established patterns of the user who is logging in, as evidenced by the corresponding archived, recorded login data objects. In some cases, rules or criteria may additionally be based on previously established patterns of multiple users. Rules and criteria may also be configured based on logical considerations such as the impossibility of a user travelling a large distance in a short amount of time between consecutive logins. That is, when a login is in a different location from where the user last logged in, there is a higher risk that the login is fraudulent.

In some cases, rules and criteria may be created based on the further analysis of logins of various users that have been found to be fraudulent. For example, attribute patterns, established by one or more users over successive logins leading up to a fraudulent login, may be analyzed to identify any usage or login patterns that typically precede to fraudulent logins. As a more specific example, multiple failed login attempts following a recent history of successful logins might indicate a relatively high likelihood that an unauthorized person is attempting to log in.

As another example, the action 308 of creating the framework may be based on analytical techniques such as cluster analysis, also referred to as clustering. Cluster analysis is a data mining technique that attempts to create groups of data objects such that the objects of a single group have similar attributes. For a given data object, it is possible to calculate a distance of the data object from any cluster or from any other data object based on the attributes of the given data object.

In embodiments described herein, clusters of successful login events (as represented by recorded login data objects) may be identified and the distance of a new login request from any cluster calculated based on the attributes of the new login request. If the distance exceeds a threshold distance, the new login request is deemed to be fraudulent. Alternatively, recorded logins that are found to be fraudulent can be analyzed and clustered, and any new login request that is within a threshold distance of any of the resulting clusters is deemed to be fraudulent.

As another example of the action 308, the attributes of recorded logins of one or more users may be analyzed using machine learning techniques to produce a model that can be subsequently used to predict the likelihood that any given login request is either fraudulent or non-fraudulent, based on the attributes of the login request. This analysis may be made using non-fraudulent recorded logins, and/or may include recorded logins that have been discovered to have been fraudulent. In this example, the risk framework may comprise the machine learning model, which can be applied to the attributes of a new login request to determine the likelihood that the login request is fraudulent.

Figure 4:
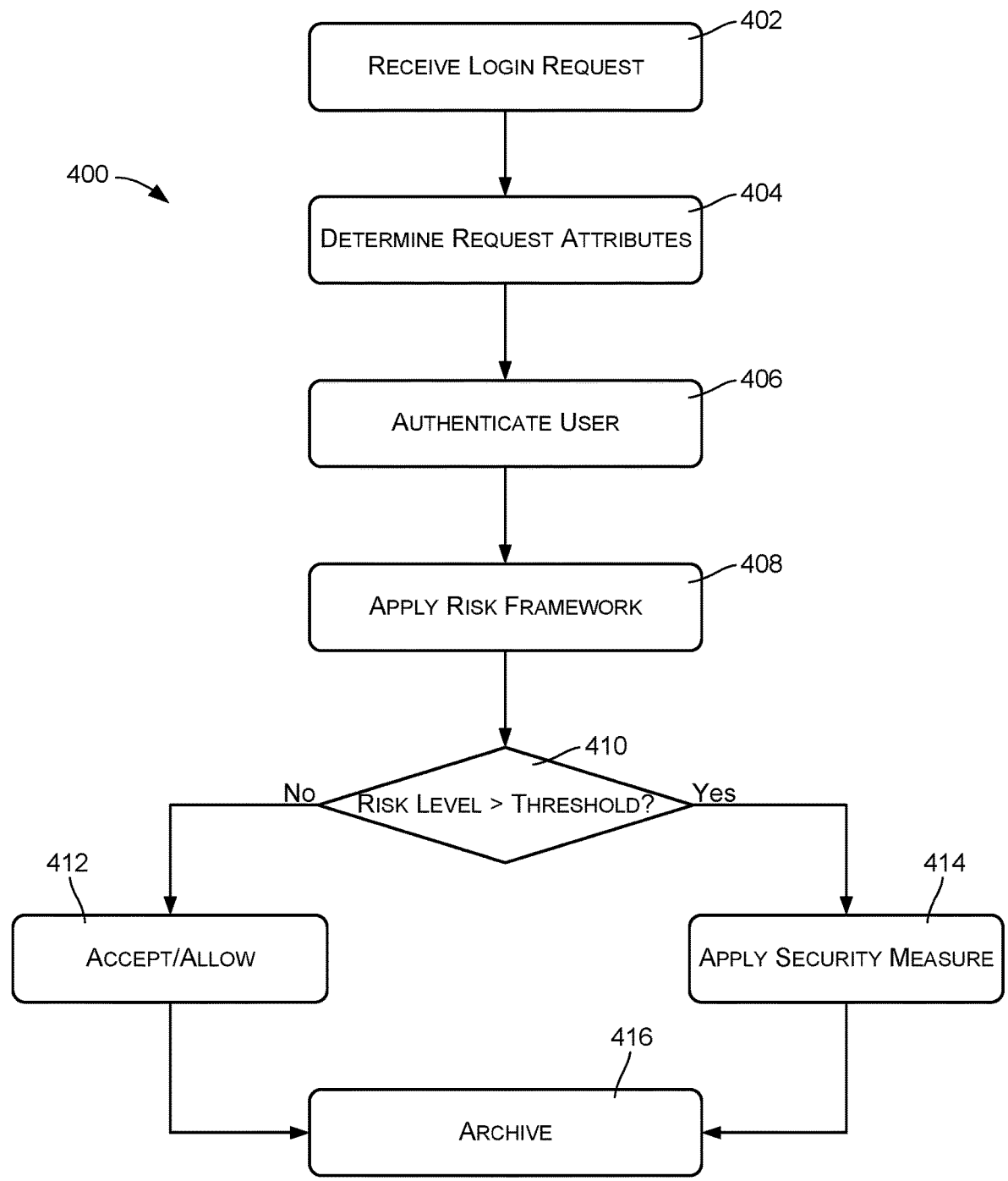

FIG. 4 illustrates an example method 400, which may be used to determine whether operations such as logins, requests, transactions, etc. should be allowed or denied.

An action 402 comprises receiving a new login request from a user.

An action 404 comprises determining attributes of the new login request, referred to herein as request attributes.

An action 406 comprises authenticating the requesting user, based on a username, password, and/or other credentials provided by the user in conjunction with the new login request. It is assumed for purposes of discussion that valid credentials are provided, either by the authorized user or by an unauthorized person impersonating the user.

An action 408 comprises evaluating the attributes of the login request using a risk framework, to determine whether the new login request is fraudulent. More specifically, in the embodiments described herein the action 408 may comprise applying a risk framework to a login request to determine a risk level.

An action 410 comprises determining whether the risk level exceeds a risk threshold. If the risk level does not exceed the risk threshold, an action 412 is performed of accepting the login request and allowing the requesting user to access network services and/or to perform other operations. If the risk level exceeds the risk threshold, an action 414 is performed of applying a security measure. The security measure may, as an example, comprise denying the login request or otherwise denying access to services, resources, or operations. Other security measures that may be applied include sending a notification to the user of the event, sending a notification to a security team of the event, and/or blocking the user from future activity to protect the user's account. In some cases, the action 414 may comprise attempting further authentication of the user, such as requesting two-factor authentication.

Although the method 400 is described above as being used to determine whether to accept login requests, the method 400 may alternatively be used to determine whether to allow other types of requests, such as requests for various types of sensitive or liability-inducing operations. That is, the actions 410, 412, and 414 may performed upon receiving a request other than a login request, to determine whether to allow the requested operation or to apply a security measure.

Note that some of the request attributes, such as the IP address of the user requesting the login, may be specified by the login request itself. Others of the request attributes, such as time and date, may be ascertained by a risk analysis component and may comprise attributes that are not directly specified by the login request.

As another example of a login attribute that is not directly specified by the login request, the risk analysis component may use the IP address specified by a login request to determine a location of the requesting user. For example, the action 404 may include using geolocation techniques to determine the approximate location of the requesting user based on the source IP address specified in the login request. More specifically, the action 404 may include looking up the source IP address in a geolocation database or service to determine the location of the requesting user.

As another example, the action 404 may include determining the location of a mobile communication device of the user, such as the smartphone 110 of FIG. 1, and using this secondarily identified location as a request attribute. For example, the IP address of the smartphone may be determined by communicating with the smartphone, and geolocation techniques may be used to determine the location of the smartphone based on its IP address. In cases where the service provider is a cellular communications provider, the location of the user's smartphone may be determined by the provider using various other means, including the same techniques that are used in conjunction with emergency calls from the smartphone. In other cases, a service provider may communicate with the user's device after receiving a login request, and may query the device to obtain the device's location. The device may determine its own location using various means, such as by using its GPS capabilities, and report the location back to the service provider.

In cases where the attributes include a first location determined by geolocating the source IP address of the login request, and a second location determined by communicating with a user's personal mobile communications device, a framework might be configured to determine whether the first location is approximately the same as the second location, and to report a high risk level for any login requests where the locations are not approximately the same. More specifically, the actions 408, 410, 412, and 414 may include comparing the first and second locations, reporting a relatively higher risk level when the first and second locations are not approximately the same, and applying a security measure when the risk level exceeds a threshold.

After either the action 412 or the action 414, an action 416 is performed of recording the attributes of the login resulting from the login request.

Figure 5:
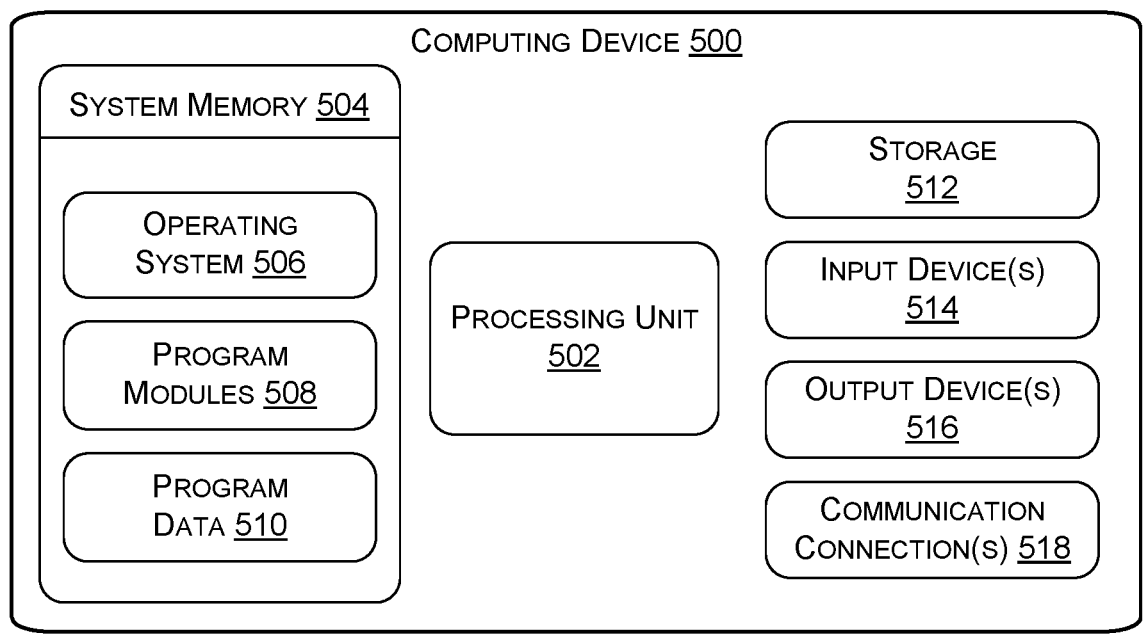
FIG. 5 is a block diagram of an example computing device that may be configured to provide network services and various functionality as described herein.

FIG. 5 is a block diagram of an illustrative computing device 500 such as may be used to implement various components of the service 106, such as servers, routers, gateways, administrative components, etc. One or more computing devices 500 may be used to implement the authentication component 112 and the risk analysis component 114, for example.

In various embodiments, the computing device 500 may include at least one processing unit 502 and system memory 504. Depending on the exact configuration and type of computing device, the system memory 504 may be volatile (such as RAM), non-volatile (such as ROM, flash memory, etc.) or some combination of the two. The system memory 504 may include an operating system 506, one or more program modules 508, and may include program data 510.

The computing device 500 may also include additional data storage devices (removable and/or non-removable) such as, for example, magnetic disks, optical disks, or tape. Such additional storage is illustrated in FIG. 5 by storage 512.

Non-transitory computer storage media of the computing device 500 may include volatile and nonvolatile, removable and non-removable media implemented in any method or technology for storage of information, such as computer readable instructions, data structures, program modules, or other data. The system memory 504 and storage 512 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such non-transitory computer-readable storage media may be part of the computing device 500.

In various embodiment, any or all of the system memory 504 and storage 512 may store programming instructions which, when executed, implement some or all of the function functionality described above as being implemented by components of the service 106, including the example methods described herein.

The computing device 500 may also have input device(s) 514 such as a keyboard, a mouse, a touch-sensitive display, voice input device, etc. Output device(s) 516 such as a display, speakers, a printer, etc. may also be included. The computing device 500 may also contain communication connections 518 that allow the device to communicate with other computing devices.

Although features and/or methodological acts are described above, it is to be understood that the appended claims are not necessarily limited to those features or acts. Rather, the features and acts described above are disclosed as example forms of implementing the claims.

What is claimed is:

1. A method, comprising:
processing multiple login events;
recording attributes of each of the multiple login events;
analyzing the attributes of the multiple login events to create a framework that evaluates attributes of login requests to predict which of the login events are fraudulent;
receiving a login request received from a user;
evaluating attributes of the login request using the framework, to predict that the login request is fraudulent; and
in response to predicting that the login request is fraudulent, applying a security measure;
wherein the attributes of the login request comprise a first location associated with the login request, the method further comprising:
communicating with a mobile communication device of the user to obtain a second location of the mobile communication device;
wherein the framework specifies that the first and second locations are to be approximately the same; and
wherein evaluating the attributes of the login request using the framework comprises determining that the first and second locations are not approximately the same.

2. The method of claim 1, wherein applying the security measure comprises requesting two-factor authentication of the user.

3. The method of claim 1, wherein applying the security measure comprises denying the login request.

4. The method of claim 1, wherein applying the security measure comprises preventing the user from performing an operation.

5. The method of claim 1, wherein the framework comprises criteria that can be evaluated based at least in part on the attributes of the login request.

6. The method of claim 1, wherein the analyzing comprises identifying clusters of the multiple login events, the login events of a particular cluster having similar attributes.

7. The method of claim 1, wherein the attributes of each of the multiple login events comprise one or more of the following:
a username of the user;
a time and/or date;
an IP address from which a login request originated;
a location determined from a source IP address of the login request by geolocation techniques;
a location of a mobile communication device associated with the user, in situations where the login request is received from a device or terminal other than the mobile communication device;
a frequency of previous login requests by the user;
identifications of previous unsuccessful logins by the user;
identifications of previous successful logins of the user;
identity of the mobile communication device;
system and configuration variables relating to the mobile communication device; or
method of providing authentication.

8. The method of claim 1, wherein the multiple login events correspond to respective users.

9. The method of claim 1, wherein:
the first location is determined based at least in part on a network address associated with a source of the login request; and
the login request is received from a device other than the mobile communication device.

10. A system comprising:
one or more processors;
one or more non-transitory computer-readable media storing computer-executable instructions that, when executed on the one or more processors, cause the one or more processors to perform actions comprising:
processing multiple login events;
analyzing attributes of the multiple login events to create a framework that evaluates attributes of login requests to predict which of the login events are fraudulent;
receiving a login request from a user;

successfully authenticating the user based at least in part on a user credential provided by the user;

evaluating attributes of the login request, using the framework, to predict that the login request is fraudulent; and in response to predicting that the login request is fraudulent, denying the login request;

wherein the attributes of the login request comprise a first location that is determined based at least in part on a network address associated with a source of the login request, the actions further comprising:

communicating with a mobile communication device of the user to obtain a second location of the mobile communication device, wherein the login request is received from a device other than the mobile communication device;

wherein the framework specifies that the first and second locations are to be approximately the same; and wherein evaluating the attributes of the login request using the framework comprises determining that the first and second locations are not approximately the same.

11. The system of claim 10, wherein the framework comprises one or more criteria that can be evaluated based at least in part on the attributes of the login request.

12. The system of claim 10, wherein analyzing the attributes of the multiple login events to create the framework comprises identifying clusters of the login events, the login events of a particular cluster having similar attributes.

13. The system of claim 10, wherein the attributes of each of the multiple login events comprise one or more of the following:

a username of the user;
a time and/or date;
an IP address from which a login request originated;
a location determined from a source IP address of the login request by geolocation techniques;
a location of a mobile communication device associated with the user, in situations where the login request is received from a device or terminal other than the mobile communication device;
a frequency of previous login requests by the user;
identifications of previous unsuccessful logins by the user;
identifications of previous successful logins of the user;
identity of the mobile communication device;
system and configuration variables relating to the mobile communication device; or
method of providing authentication.

14. A method, comprising:

receiving a login request from a user;

successfully authenticating the user based at least in part on a user credential provided by the user;

determining a first location from which the login request was sent;

communicating with a mobile communication device of the user to obtain a second location of the mobile communication device;

determining that the first location is not approximately the same as the second location; and in response to determining that the first location is not approximately the same as the second location, applying a security measure.

15. The method of claim 14, wherein determining the first location is based at least in part on a network address corresponding to a network source of the login request.

16. The method of claim 14, wherein the login request is received from a source other than the mobile communication device.

17. The method of claim 14, wherein applying the security measure comprises one or more of:

denying the login request;
sending a notification to the user;
sending a notification to a security team; or
blocking use from future activity to protect the user's account.

18. The method of claim 14, wherein applying the security measure comprises requesting two-factor authentication of the user.

* * * * *